(12) United States Patent
Badr et al.

(10) Patent No.: US 10,565,256 B2
(45) Date of Patent: Feb. 18, 2020

(54) CONTEXTUALLY DISAMBIGUATING QUERIES

(71) Applicant: Google LLC, Mountain View, CA (US)

(72) Inventors: Ibrahim Badr, Zurich (CH); Nils Grimsmo, Adliswil (CH); Gokhan H. Bakir, Zurich (CH); Kamil Anikiej, Lachen (CH); Aayush Kumar, Zurich (CH); Viacheslav Kuznetsov, Rüschlikon (CH)

(73) Assignee: Google LLC, Mountain View, CA (US)

( * ) Notice: Subject to any disclaimer, the term of this patent is extended or adjusted under 35 U.S.C. 154(b) by 203 days.

(21) Appl. No.: 15/463,018

(22) Filed: Mar. 20, 2017

(65) Prior Publication Data
US 2018/0267994 A1   Sep. 20, 2018

(51) Int. Cl.
*G06F 16/58* (2019.01)
*G06K 9/72* (2006.01)
*G06F 16/9032* (2019.01)
*G06K 9/32* (2006.01)

(52) U.S. Cl.
CPC ...... *G06F 16/5866* (2019.01); *G06F 16/9032* (2019.01); *G06K 9/3258* (2013.01); *G06K 9/72* (2013.01); *G06K 2209/01* (2013.01)

(58) Field of Classification Search
CPC . G06F 16/5866; G06F 17/30268; G06K 9/72; G06K 2209/01
See application file for complete search history.

(56) References Cited

U.S. PATENT DOCUMENTS

| | | | |
|---|---|---|---|
| 6,101,492 A | 8/2000 | Jacquemin et al. | |
| 7,805,441 B2 | 9/2010 | Madhavan et al. | |
| 8,478,773 B1 | 7/2013 | Bryukhov et al. | |
| 8,635,203 B2 | 1/2014 | Chennavasin | |
| 9,135,238 B2 | 9/2015 | Bunescu et al. | |
| 9,361,365 B2 | 6/2016 | Sweeney et al. | |
| 9,772,812 B1 * | 9/2017 | Webster | G06F 3/1423 |

(Continued)

OTHER PUBLICATIONS

Anonymous, Google I/O 2013 Keynote Transcript, Jun. 2014. Retrieved from Internet: https://sinjupost.com/google-io-2013-keynote-transcript/?singlepage=1; (Year: 2014).*

Youtube video entitled 'Google I/O 2013: Keynote', uploaded on May 15, 2013 by user "Google Developers", retrieved from Internet: <https://www.youtube.com/watch?v=9pmPa_KxsAM> (Year: 2013).*

(Continued)

*Primary Examiner* — James Trujillo
*Assistant Examiner* — Cheryl M Shechtman
(74) *Attorney, Agent, or Firm* — Fish & Richardson P.C.

(57) ABSTRACT

Methods, systems, and apparatus, including computer programs encoded on a computer storage medium, for contextually disambiguating queries are disclosed. In an aspect, a method includes receiving an image being presented on a display of a computing device and a transcription of an utterance spoken by a user of the computing device, identifying a particular sub-image that is included in the image, and based on performing image recognition on the particular sub-image, determining one or more first labels that indicate a context of the particular sub-image. The method also includes, based on performing text recognition on a portion of the image other than the particular sub-image, determining one or more second labels that indicate the context of the particular sub-image, based on the transcription, the first labels, and the second labels, generating a search query, and providing, for output, the search query.

18 Claims, 6 Drawing Sheets

(56) References Cited

U.S. PATENT DOCUMENTS

| | | |
|---|---|---|
| 2008/0052638 A1* | 2/2008 | Frank ................ G06K 9/00476 |
| | | 715/808 |
| 2008/0195601 A1 | 8/2008 | Ntoulas et al. |
| 2011/0035406 A1 | 2/2011 | Petrou et al. |
| 2011/0282906 A1 | 11/2011 | Wong |
| 2013/0311509 A1 | 11/2013 | Taubman et al. |
| 2014/0233863 A1* | 8/2014 | Barrington .......... G06F 16/5866 |
| | | 382/305 |
| 2015/0088923 A1 | 3/2015 | Garcia-Barrio et al. |
| 2015/0186511 A1 | 7/2015 | Trollope et al. |
| 2016/0259863 A1 | 9/2016 | Allen et al. |
| 2017/0300531 A1* | 10/2017 | Poovananathan ... G06F 16/2455 |

OTHER PUBLICATIONS

GB Search and Examination Report issued in British Application No. GB1717984.7, dated Apr. 5, 2018, 6 pages.

Written Opinion issued in International Application No. PCT/US2017/023217, dated Oct. 29, 2018, 12 pages.

International Search Report and Written Opinion issued in International Application No. PCT/US2017/023217, dated Oct. 2, 2017, 19 pages.

GB Office Action issued in Great Britain Application No. GB1717984.7, dated Oct. 21, 2019, 4 pages.

PCT International Preliminary Report on Patentability issued in International Application No. PCT/US2017023217, dated Oct. 3, 2019, 13 pages.

\* cited by examiner

CONTEXTUALLY DISAMBIGUATING QUERIES

FIELD

The present specification relates to search engines.

BACKGROUND

In general, a search query includes one or more terms that are submitted to a search engine upon request of the execution of a search. For example, a user may enter query terms of a search query by typing on a keyboard, or in the instance of a voice query, by speaking the query terms into a microphone of a computing device. Voice queries may be processed using speech recognition technology.

SUMMARY

In some implementations, an image corresponding to a portion of a display of a computing device may be analyzed to aid a query processing system in answering a natural language query. For example, a user may ask a question about a photograph that the user is viewing on the computing device, such as "What is this?" The computing device may detect the user's utterance and capture a respective image of the computing device that the user is viewing. The computing device processes the utterance to generate a transcription of the utterance spoken by the user of the computing device. The computing device transmits the transcription and the image to a server.

The server receives the transcription and the image from the computing device. The server can identify visual and textual content in the image. The server generates labels for the image that correspond to content of the image, such as locations, entities, names, types of animals, etc. The server can identify a particular sub-image in the image. The particular sub-image may be a photograph or drawing. In some aspects, the server identifies a portion of the particular sub-image that is likely of primary interest to the user, such as a historical landmark in the image. The server can perform image recognition on the particular sub-image to generate labels for the particular sub-image. The server can also generate labels for textual content in the image, such as comments that correspond to the particular sub-image, by performing text recognition on a portion of the image other than the particular sub-image. The server can generate a search query based on the received transcription and the generated labels. Further, the server may be configured to provide the search query for output to a search engine.

One innovative aspect of the subject matter described in this specification is embodied in methods that include the actions of receiving an image being presented on, or corresponding to, at least a portion of a display of a computing device, and receiving a transcription of, or that corresponds to, an utterance spoken by a user of the computing device, typically at the same time as the image is being presented, identifying a particular sub-image that is included in the image, and based on performing image recognition on the particular sub-image, determining one or more first labels that indicate a context of the particular sub-image. The method also includes, based on performing text recognition on a portion of the image other than the particular sub-image, determining one or more second labels that indicate the context of the particular sub-image, based on the transcription, the first labels, and the second labels, generating a search query, and providing, for output, the search query.

Such method steps, or other combinations of steps as described herein, may be carried out automatically and without further user intervention, for example in response to an automatic determination by the computing device that the method should be carried out at a particular time, or following a particular button press, spoken command or other indication from a user of the computing device that such a method is to be carried out. The methods described here may therefore provide a more efficient user interface to the user device by reducing the input required of a user to achieve desired or desirable search query generation.

Other implementations of this and other aspects include corresponding systems, apparatus, and computer programs, configured to perform the actions of the methods, encoded on computer storage devices.

Implementations may each optionally include one or more of the following features. For instance, the methods can include weighting the first label differently than the second labels. The methods can also include generating the search query by substituting one or more of the first labels or the second labels for terms of the transcription. In some aspects, the methods include generating, for each of the first labels and the second labels a label confidence score that indicates a likelihood that the label corresponds to a portion of the particular sub-image that is of primary interest to the user, and selecting one or more of the first labels and second labels based on the respective label confidence scores, wherein the search query is generated based on the one or more selected first labels and second labels. Further, the methods can include accessing historical query data that includes previous search queries provided by other users, generating, based on the transcription, the first labels, and the second labels, one or more candidate search queries, comparing the historical query data to the one or more candidate search queries, and based on comparing the historical query data to the one or more candidate search queries, selecting the search query from among the one or more candidate search queries.

The methods may include generating, based on the transcription, the first labels, and the second labels, one or more candidate search queries, determining, for each of the one or more candidate search queries, a query confidence score that indicates a likelihood that the candidate search query is an accurate rewrite of the transcription, and selecting, based on the query confidence scores, a particular candidate search query as the search query. Additionally, the methods can include identifying one or more images that are included in the image, generating for each of the one or more images that are included in the image, an image confidence score that indicates a likelihood that an image is an image of primary interest to the user, and based on the image confidence scores for the one or more images, selecting the particular sub-image. The methods can include receiving data indicating a selection of a control event at the computing device, wherein the control event identifies the particular sub-image. In some aspects, the computing device is configured to capture the image and capture audio data that corresponds to the utterance in response to detecting a predefined hotword.

Further, the methods may include receiving an additional image of the computing device and an additional transcription of an additional utterance spoken by a user of the computing device, identifying an additional particular sub-image that is included in the additional image, based on performing image recognition on the additional particular sub-image, determining one or more additional first labels that indicate a context of the additional particular sub-image, based on performing text recognition on a portion of the additional image other than the additional particular sub-image, determining one or more additional second labels that indicate the context of the additional particular sub-image, based on the additional transcription, the additional first labels, and the additional second labels, generating a command, and performing the command. In this instance, performing the command can include performing one or more of storing the additional image in memory, storing the particular sub-image in the memory, uploading the additional image to a server, uploading the particular sub-image to the server, importing the additional image to an application of the computing device, and importing the particular sub-image to the application of the computing device. In certain aspects, the methods can include identifying metadata associated with the particular sub-image, wherein determining the one or more first labels that indicate the context of the particular sub-image is based further on the metadata associated with the particular sub-image.

Advantageous implementations can include one or more of the following features. The methods can determine context of an image corresponding to a portion of a display of a computing device to aid in the processing of natural language queries. The context of the image may be determined through image and/or text recognition. Specifically, the context of the image may be used to rewrite a transcription of an utterance of a user. The methods may generate labels that refer to the context of the image, and substitute the labels for portions of the transcription. For example, a user may be viewing a photograph on a computing device and ask "Where was this taken?" The methods may determine that the user is referring to the photo on the screen of the computing device. The methods can extract information about the photo to determine a context of the photo, as well as a context of other portions of the image that do not include the photo. In this instance, the context information may be used to determine a location that the photo was taken. As such, the methods may use images corresponding to displays of computing devices to aid in the generation of search queries.

In some aspects, the methods may identify a particular sub-image in the image that is a primary focus of the user. The methods may generate labels that correspond to the particular sub-image, and weight labels corresponding to the particular sub-image differently than other labels so that the context of the image may be more effectively determined. The methods may weight of labels based on a prominence of the particular sub-image in the image, a frequency that the particular sub-image labels appear in historical search queries, a frequency that the particular sub-image labels appear in recent search queries, etc. Therefore, the methods may identify primary points of user interest in the image to determine context of the image as a whole.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
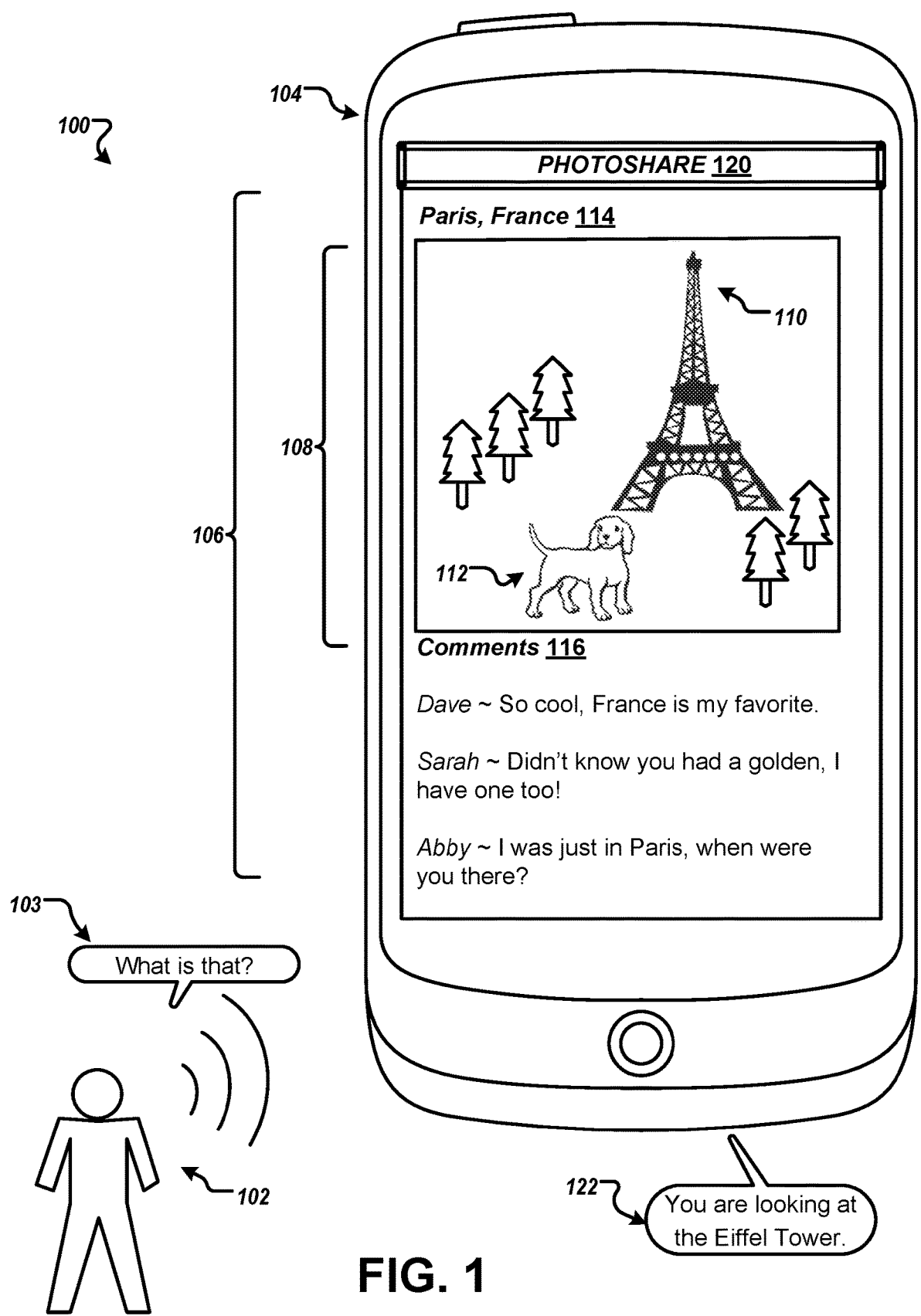
FIG. 1 is a diagram of an example environment for contextually disambiguating a query.

FIG. 1 is a diagram of an example environment 100 for contextually disambiguating a query. The environment 100 includes a user 102 and a computing device 104. In the environment 100, the user 102 provides an utterance 103, such as a query, to the computing device 104. The user 102 may ask a question about one or more objects displayed on a graphical display of the computing device 104. For example, the utterance 103 may include a query such as "What is that?" In this instance, the user 102 may be referencing objects, such as an image, text, video, or any combination thereof, that are displayed on the graphical display of the computing device 104. The computing device 104 may include one or more computing devices such as a laptop, desktop, smartphone, tablet, or any other computing device that is known.

The utterance 103 of the user 102 may be contextually ambiguous. In this instance, the utterance 103 may not directly reference the content being displayed at the computing device 102 by name. However, a context of the displayed objects may be determined and the context may be used in combination with a transcription corresponding to the utterance 103 to disambiguate the query.

The computing device 104 may be configured to capture an image 106 being presented on a display of the computing device 104 when the utterance 103 of the user 102 is received. For example, the computing device 104 may capture a portion of the display that includes a photograph 108 and comments 116 that correspond to the photograph, but does not include a logo icon 120 such as an application title that the computing device 104 is running. In some examples, the image 106 corresponds to a screenshot of the computing device 104. Alternatively, or additionally, the computing device 104 may persistently capture the displayed content and transmit particular sub-images upon detection of the utterance 103. Further, the image 106 may be captured upon detection of a predefined hotword in the utterance 103. The computing device 104 may transcribe the utterance 103. In some implementations, the computing device 104 may transmit audio data corresponding to the utterance 103 to a speech recognition engine and receive a transcription of the utterance 103 from the speech recognition engine.

The transcription corresponding to the utterance 103 and the image 106 may be transmitted to a server over a network for processing (e.g., disambiguation of the utterance). The server may be configured to determine a context of the image 106 by analyzing the image 106. The server may determine the context of the image 106 by identifying and analyzing images or photographs in the image. For example, photograph 108 may be analyzed to identify that the photograph 108 includes one or more entities in the photograph 108. Referring to the example environment 100 of FIG. 1, the photograph 108 may be identified by the server and then analyzed to determine that the photograph 108 includes entities such as the Eiffel Tower 110 and a dog 112 in front of the Eiffel Tower 110.

In some examples, the server performs image recognition on the particular sub-image 108. The image recognition is performed to determine one or more first labels that indicate a context of the particular sub-image. For example, the server may perform image recognition on the photograph 108 and determine first labels that correspond to the photograph 108, such as Eiffel Tower, France, Paris, and dog. The image recognition can include a determination of entities in focus in the photograph 108, entities in the foreground and background of the photograph 108, relative sizes of entities in the photograph 108, and the like. In some examples, the server may identify metadata associated with the particular sub-image, or the photograph 108 in FIG. 1. The server can use the metadata to determine the first labels that correspond to the particular sub-image.

Additionally, the server can perform text recognition on the image 106. The server may perform text recognition on a portion of the image 106 other than the photograph 108. The portion of the image 106 may include a title 114 of the photograph 108 and/or comments 116 that refer to the photograph 108. For example, image 106 of FIG. 1 includes a title 114 indicating a location that the photograph 108 was taken, such as Paris, France. The image 106 also includes comments 116 that refer to the photograph 108 such as "Dave~So cool, France is my favorite." "Sarah~Didn't know you had a golden, I have one too!" and "Abby~I was just in Paris, when were you there?"

The title 114 and the comments 116 of the image 106 may be processed by the server via text recognition. By performing text recognition, the server can determine one or more second labels that further indicate the context of the particular sub-image. For example, the server may perform text recognition on the title 114 to verify that the location of the particular sub-image is Paris, France. Further, the server may perform text recognition on the comments 116 to verify that the location of the particular sub-image is Paris, France, (e.g., by performing text recognition on the phrase "I was just in Paris.") Additionally, the server may perform text recognition on the comments 116 to determine that the dog 112 in the photograph 108 is a golden retriever, (e.g., by performing text recognition on the phrase "Didn't know you had a golden . . . ") As such, the server may generate one or more second labels such as Paris, France, and golden retriever.

The server can be configured to generate a search query based on the received transcription, the first labels, and the second labels. The server may generate the search query automatically without further user intervention. For example, in response to automatically determining by the computing device 104 that the method should be carried out at a particular time, following a particular button press that precedes the utterance, following a spoken command/hotword included in the utterance, or any other indication from the user 102 of the computing device 104 that such a method is to be carried out before the transcription and the image is received by the server.

The search query may be generated by rewriting the transcription. In some aspects, the transcription may be rewritten by substituting one or more of the first and/or second labels into the transcription. For example, the transcription may include "What is that?" In this instance, the phrase "the Eiffel Tower" may be substituted for the term "that" in the transcription. Therefore, the search query may be rewritten to include the following, "What is the Eiffel Tower?"

In some aspects, the server is configured to generate a label confidence score for each of the first and second labels. In this instance, the label confidence scores may indicate a relative likelihood that each label corresponds to a portion of the particular sub-image that is of primary interest to the user 102. For example, a first label may include "Eiffel Tower" with a confidence score of 0.8, and a second label may include "golden retriever" with a confidence score of 0.5. In this instance, the confidence scores may indicate that the first label corresponds to an entity that is more likely to be of primary interest to the user 102 based on the greater, respective label confidence score.

Labels may be selected to generate the search query based on the confidence scores. For example, a certain number of labels with the highest confidence score may be selected to generate to search query in combination with the transcription. In another example, all labels that satisfy a particular label confidence score threshold may be used in combination with the transcription to generate the search query. In another example, the server may generate label confidence scores based on a frequency of the labels appearing in recent search queries, a frequency of the labels appearing in all historical search queries, and so on.

The server can be configured to access historical search query data. The historical query data may include a number of previous search queries provided by the user 102 and/or other users. The server can generate one or more candidate search queries based on the transcription, the first labels, and the second labels, and compare the historical query data to the candidate search queries. Based on comparing the historical query data to the one or more candidate search queries, the server may select a particular candidate search query as the search query. For example, the server may select the particular candidate search query based on a comparison between a frequency of the candidate search queries appearing in recent search queries, such as queries input by the user, and/or a frequency of the candidate search queries appearing in historical search queries, such as queries entered by all users into a search engine.

The server can be configured to provide the generated search query for output. For example, the server can be configured to provide the generated search query to a search engine. In another example, the server may generate the search query and transmit the search query to the computing device 102. In this instance, the search query may be provided to the user 102 audially or visually by the computing device 104 to verify that the server has accurately rewritten the query.

The server can further be configured to provide the generated search query for output and/or a search result to the computing device 104. In this instance, the computing device 104 can be configured to receive the search query and provide a search result that corresponds to the search query for output 122, such as "You are looking at a photograph of the Eiffel Tower."

Figure 2:
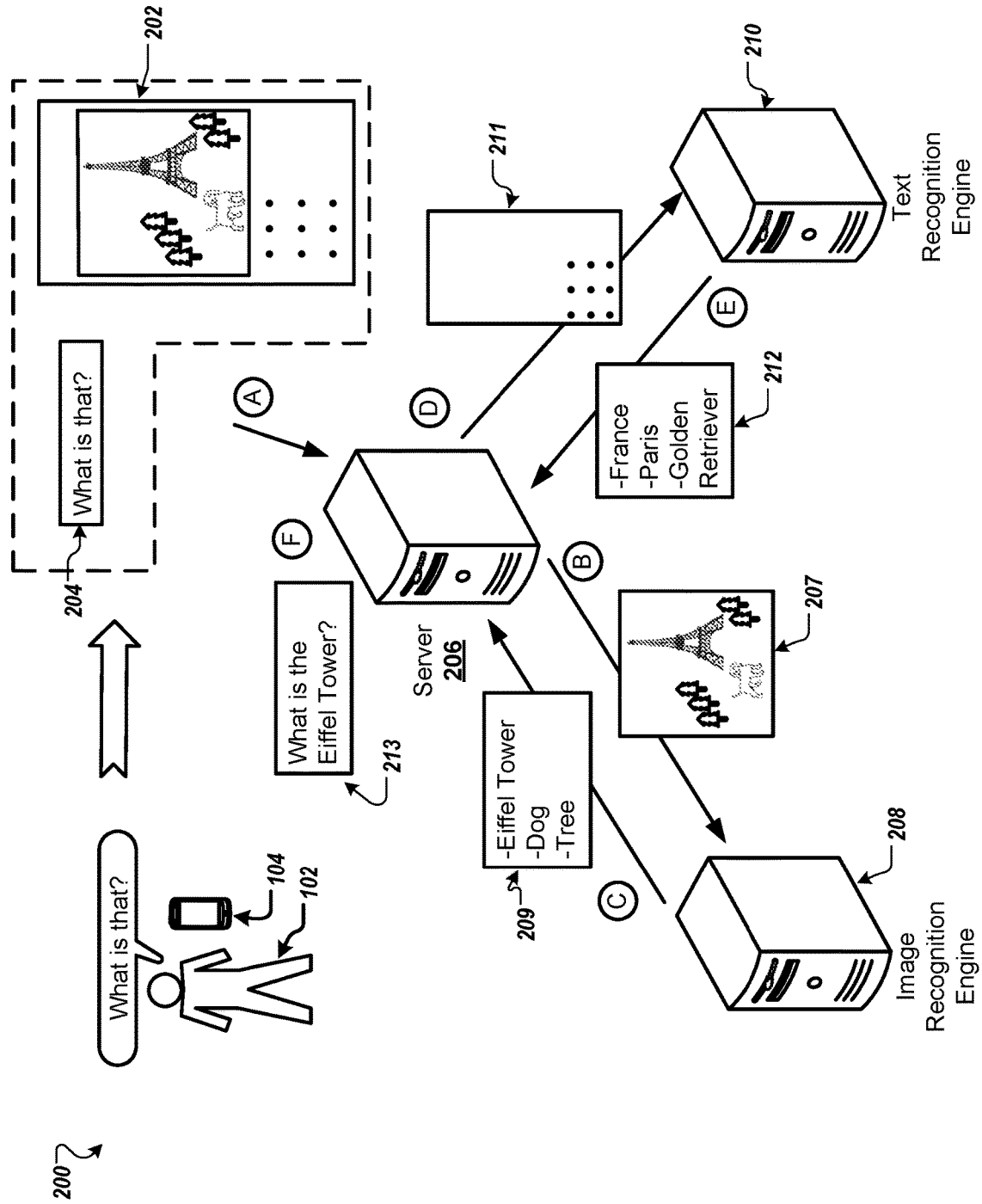
FIG. 2 is a diagram of an example system for contextually disambiguating a query.

FIG. 2 is a diagram of an example system 200 for contextually disambiguating a query. The system 200 includes the user 102, the computing device 104, a server 206, an image recognition engine 208, and a text recognition engine 210. The computing device 104 is in communication with the server 206 over one or more networks. The computing device 104 can include a microphone or other detection mechanisms for detecting utterances of the user 102.

In an example, the user 102 may provide an utterance to the computing device 104. The utterance may be detected and transcribed by the computing device 102. As such, the computing device 104 may generate a transcription 204 that corresponds to the utterance of the user 102. The computing device 104 may also be configured to capture an image 202 of a graphical display of the computing device 104. The computing device 104 may capture the image 202 upon detecting the utterance of the user 102 or upon transcribing the utterance. Additionally, or alternatively, the computing device 104 can be configured to persistently capture the displayed contents of the computing device 104. In this instance, a particular sub-image may be transmitted with the transcription 204 to the server 206 upon detection of the utterance.

In another example, the computing device 104 can be configured to transmit the utterance of the user 102 to the server 206. For example, the computing device 104 can be configured to detect a predefined hotword in the utterance, and upon detection of the hotword, transmit the utterance to the server 206. In this instance, the server 206 is configured to generate a transcription corresponding to the utterance.

At event (A), the server 206 receives the transcription 204 and the image 202 from the computing device 104. The computing device 104 may transmit the transcription 204 and the image 202 automatically to the server 206. The computing device 104 may also transmit the transcription 204 and the image 202 upon user input. For example, the user may provide the utterance as well as touch input at the graphical display of the computing device 104 indicating that the user requests a transcription corresponding to the utterance and the image to be sent to the server 206.

At event (B), the server 206 identifies a particular sub-image 207 of the image 202 and transmits the particular sub-image 207 to an image recognition engine 208. In some aspects, the server 206 is in communication with the image recognition engine 208 over the network. In other aspects, the server 206 and the image recognition engine 208 are integrated into a single system.

In some examples, the image 202 may include multiple images. The server 206 can analyze the multiple images to determine the particular sub-image 207 that is likely of interest to the user 102. Additionally, the server 206 may receive user input indicating the particular sub-image 207 of the images in the image 202 is of primary interest to the user 102. The server 206 may generate an image confidence score for each of the multiple images in the image 202. The image confidence score can indicate a relative likelihood that an image is an image of primary interest to the user 102. The server 206 may determine the particular sub-image 207, or the image of primary interest to the user 102, based on the generated confidence scores. For example, the server 206 may identify that the display of the computing device 104 includes a first portion and a second portion. The first portion may include a photograph and the second portion may include a logo image that corresponds to a title of the application that computing device is using. The server may be configured to generate a confidence score of 0.9 for the first portion and a confidence score of 0.3 for the second portion. In this instance, the server 206 determines that the first portion is likely to be of primary interest to the user 102 based on the generated confidence scores.

The server may be configured to determine the particular sub-image 207 based on receiving data indicating a selection of a control event. The control event may correspond to the user 102 providing input at the computing device 104. Specifically, the control event may correspond to the user 102 interacting with the display of the computing device 104. For example, the user 102 may interact with a portion of the display that corresponds to the particular sub-image 207. The server 206 may receive data indicating that the user 102 interacted with a portion of the display that corresponds to the particular sub-image 207, and therefore may determine that the portion of the display corresponds to the particular sub-image 207.

At event (C), the image recognition engine 208 performs image recognition on the particular sub-image 207. The image recognition engine 208 performs image recognition to generate labels 209 for the particular sub-image 207 that indicate a context of the particular sub-image. The labels 209 may correspond to entities in the particular sub-image 207, such as trees or a dog. The labels 209 can also correspond to entities including specific locations or landmarks, such as the Eiffel Tower. The labels 209 may be used individually or in combination to determine a context of the particular sub-image 207.

The image recognition engine 208 may be configured to determine a portion of the particular sub-image 207 that is of primary focus of the user 102. For example, the image recognition engine 208 can analyze the particular sub-image 207 to determine that the particular sub-image 207 includes entities such as the Eiffel Tower and a dog. The image recognition engine 208 can analyze the entities in the particular sub-image 207 and determine that the Eiffel Tower is greater in size than the dog. Based on the determination that the Eiffel Tower is proportionally greater in size to the dog, the image recognition engine 208 may determine that the Eiffel Tower 110 is likely of primary interest to the user 102. Additionally, or alternatively, the image recognition engine 208 may be configured to analyze other aspects of the particular sub-image 207 such as foreground vs. background, entities in focus of the particular sub-image 207, and the like. For example, the image recognition engine 208 may determine that the Eiffel Tower is in focus in the particular sub-image 207 and that the dog is out of focus. As such, the image recognition engine 208 can determine that the Eiffel Tower is likely of primary interest to the user 102.

At event (D), the server 206 identifies one or more portions 211 of the image 202 that do not include the particular sub-image. The one or more portions 211 are transmitted to the text recognition engine 210. In some aspects, the server 206 is in communication with the text recognition engine 210 over the network. In other aspects, the server 206 and the text recognition engine 210 are integrated into a single system. Further, the server 206, the image recognition engine 208, and the text recognition engine 210 may be integrated into a single system. In some examples, the one or more portions 211 may include a title included in the image 202, comments included in the image 202, or any content in the image 202 that does not include the particular sub-image 207.

At event (E), the text recognition engine 210 performs text recognition on the one or more portions 211 of the image 202 that do not include the particular sub-image 207. The text recognition engine 210 performs text recognition to generate labels 212 for the one or more portions 211 that indicate a context of the particular sub-image 207. For example, the portions 211 may include comments such as "Dave~So cool, France is my favorite." "Sarah~Didn't know you had a golden, I have one too!" and "Abby~I was just in Paris, when were you there?" The labels 212 may directly correspond to text in the one or more portions 211. In this instance, the labels 212 may include terms such as "France" or "Paris." The labels 212 can be inferred from the text in the one or more portions 211. In this instance, the labels 212 may be inferred to include the phrase "golden retriever." The labels 212 may be used individually or in combination to determine a context of the particular sub-image 207.

By performing text recognition, the text recognition engine 210 can determine one or more labels 212 that further indicate the context of the particular sub-image 207. For example, the text recognition engine 210 may perform text recognition on the comments 116 to verify that the location of the particular sub-image 207 is Paris, France, (e.g., by performing text recognition on the phrase "I was just in Paris.") Additionally, the text recognition engine 210 may perform text recognition on the comments to determine that the dog in the particular sub-image 207 is a golden retriever, (e.g., by performing text recognition on the phrase "Didn't know you had a golden . . . ") As such, the text recognition engine 210 may generate one or more labels 212 such as Paris, France, and golden retriever.

At event (F), the server 206 generates a search query 213 using the transcription 204, the labels 209 from the image recognition engine 208, and the labels 212 from the text recognition engine 210. The server 206 may generate the search 213 query automatically without further user intervention. For example, in response to automatically determining by the computing device 104 that the method should be carried out at a particular time, following a particular button press that precedes the utterance, following a spoken command/hotword included in the utterance, or any other indication from the user 102 of the computing device 104 that such a method is to be carried out before the transcription 204 and the image 202 is received by the server 206.

The server 206 may rewrite the transcription 204 as the search query 213. The server 206 may substitute a subset of the labels of the image recognition engine 209 and the text recognition engine 212 into the transcription 204 to generate the search query 213. For example, the server 206 may substitute the label of "Eiffel Tower" into the transcription 204 so that the generated search query 213 includes "What is the Eiffel Tower?"

Further, at event (F) the server 206 provides the generated search query 213 for output. For example, the server 206 may provide the search query 213 to a search engine. The server 206 may receive search results from the search engine and provide the search results to the computing device 104 over the network. In some aspects, the computing device 104 may receive the search results and provide the search results as audio or visual output. For example, the server 206 may generate the search query 213 "What is the Eiffel Tower?" and provide the generated search query 213 to the computing device 104. In this instance, the computing device 104 may be configured to audially output the generated search query 213 to the user 102 for verification before inputting the search query 213 to a search engine.

In some examples, the server 206 generates the search query 213 according to generated weightings of the labels 209 and 212. In this instance, the server 206 may generate a first weight for the image labels 209 that differs from a second weight for the textual labels 212. For example, the server 206 may determine that the image labels 209 are more relevant to the transcription 204 than the textual labels 212. As such, the server 206 may place greater emphasis on the image labels 209, by weighting the image labels 209 more than the textual labels 212.

The server 206 may be configured to receive an additional image of the computing device 104 and an additional transcription of an additional utterance spoken by a user of the computing device 104. The server 206 may identify an additional particular sub-image that is included in the additional image and transmit the additional particular sub-image to the image recognition engine 208 to perform image recognition on the additional particular sub-image. The image recognition engine 208 can be configured to generate one or more additional first labels for the additional particular sub-image that indicate a context of the additional particular sub-image. Likewise, the server can be configured transmit a portion of the additional image that does not include the additional particular sub-image to the text recognition engine 210 to generate one or more additional second labels based on performing text recognition on the portion of the additional image other than the additional particular sub-image.

The server 206 may use the additional transcription, the additional first labels, and the additional second labels to generate a command or action. The command may be automatically performed by the server 206, provided to the computing device 104, and the like. In some examples, the command may include one or more actions such as storing the additional image in memory, storing the additional particular sub-image in the memory, uploading the additional image to the server 206, uploading the additional particular sub-image to the server 206, importing the additional image to an application of the computing device 104, and importing the particular sub-image to the application of the computing device 104. For example, the user 102 may be viewing visual and textual content in a notes application on the display of the computing device 104. Using the received transcription and the generated labels, the server 206 can be configured to capture a portion of an image in the notes application and upload the portion of the image to the cloud for storage.

In certain aspects, the server 206 provides the search query 213 to the computing device 104. In this instance, the computing device 104 may provide the search query 213 for verification by the user 102, before providing the search query 213 as input to a search engine. As such, the search query 213 may be accepted, modified, or declined by the user 102. For example, in response to receiving the search query 213 at the computing device 104, the user 102 may provide user input indicating that the search query 213 is to be provided to a search engine. In another example, the user 102 may provide user input indicating that the search query 213 is to be modified before being provided to the search engine. As such, the user may directly modify the search query 213, or ask for another search query from the server 206. In another example, the user 102 may provide user input indicating that the search query 213 is declined. As such, the user 102 may ask for another search query from the server 206, or provide another utterance to be used in the generation of another search query.

Figure 3:
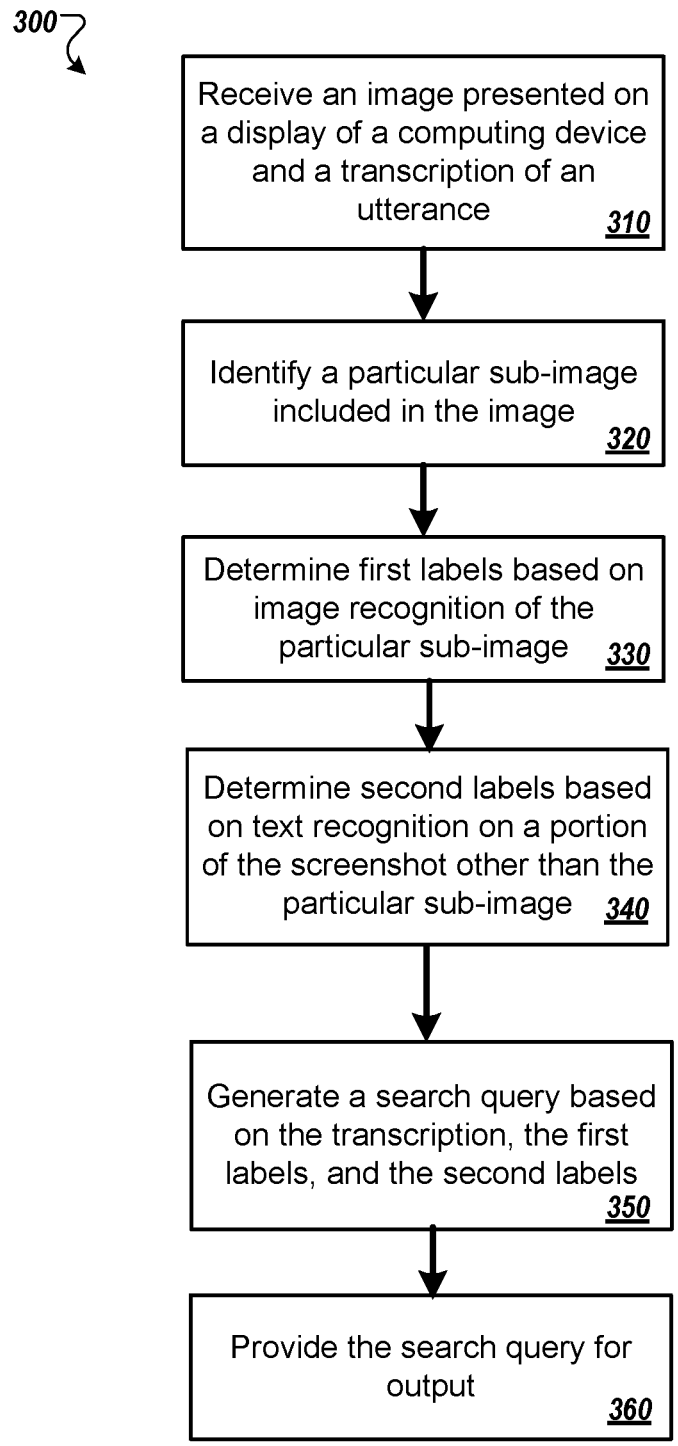
FIG. 3 is a flow chart illustrating an example process for contextually disambiguating a query.

FIG. 3 is a flow chart illustrating an example process 300 for contextually disambiguating a query. The process 300 can be performed by one or more servers or other computing devices. For example, operations of the process 300 can be performed by server 206 of FIG. 2. Operations of process 300 can also be implemented as instructions stored on a non-transitory computer-readable medium, and when the instructions are executed by one or more servers (or other computing devices,) the instructions cause the one or more servers to perform operations of the process 300.

At step 310, the server receives an image and a transcription of an utterance. The image may correspond to a graphical display of a computing device in communication with the server. For example, the computing device may capture the image upon receiving the utterance. In some aspects, the image may correspond to a graphical display of the computing device when the computing device is in a camera mode. As such, the image may correspond to a photograph that the computing device captures, or is viewing by a camera in communication with the computing device. Further, the image may correspond to a video that is captured by the camera of the computing device or a video displayed at a display of the computing device. Additionally, or alternatively, the computing device may transmit background noise captured while receiving the utterance. In this instance, the server may use the background noise to generate additional labels and/or to score the generated labels.

The transcription may correspond to an utterance received by the computing device. In some aspects, the transcription is generated by the computing device based on the received utterance. In other aspects, the transcription corresponds to user input received by the computing device. For example, a user may input a question via a keyboard or user interface of the computing device. The computing device may generate the transcription based on the input and provide the transcription to the server.

At step 320, the server identifies a particular sub-image included in the image. The server is configured to identify a particular sub-image out of one or more images in the image. The particular sub-image may be an image that is likely to be of primary focus or interest of a user. For example, the image may include a photograph as well as multiple other graphical icons. The server can be configured to analyze the image in order to determine that the photograph is of primary interest to the user, while the other graphical icons in the display are not of primary interest to the user.

At step 330, the server determines one or more first labels based on image recognition of the particular sub-image. The server may perform image recognition on the particular sub-image in the image to identify one or more entities in the particular sub-image, and generate respective labels for the one or more entities. Each of the one or more entities may correspond to one or more respective, first labels. The first labels may be determined in part using metadata associated with the particular sub-image. The first labels may indicate a context of the particular sub-image. In certain aspects, the server is configured to perform image recognition over the entire image. In this instance, the first labels may be generated for all entities identified by image recognition in the image.

At step 340, the server determines one or more second labels based on text recognition on a portion of the image other than the particular sub-image. The server may perform text recognition on the portion of the image other than the particular sub-image to identify textual content in the image to use in the generation of labels that indicate a context of the content. The textual content may be labeled using one or more second labels that indicate a context of the particular content.

The second labels may be determined in part using metadata associated with the portion. For example, the server may be configured to access and capture code relating to displaying content on the display of the computing device. In this instance, the server may access markup code and capture the markup code to analyze for metadata that may be used in the generation of the second labels. In some aspects, the server is configured to perform text recognition over the entire image. In this instance, the second labels may be generated for all textual content identified by text recognition in the image.

At step 350, the server generates a search query based on the transcription, the first labels, and the second labels. Specifically, the server is configured to generate the search query based on the transcription, and the labels. In some examples, the server is configured to generate multiple candidate search queries based on the transcription and the labels. The candidate search queries may be ranked based on historical query data. As such, a top ranked candidate search query may be selected as the search query.

At step 360, the server provides the search query for output. The selected search query may be provided to a search engine directly. In this instance, the server may also be configured to receive one or more search results from the search engine and provide the search results for output. For example, the server may provide the search query to the search engine, select a particular search result, and provide the search result to the computing device for audial or visual output.

In other aspects, the search query may be provided to the computing device. The computing device may provide the search query for audial or visual output. In this instance, the search query may be verified by a user before being provided as input to a search engine.

Figure 4:
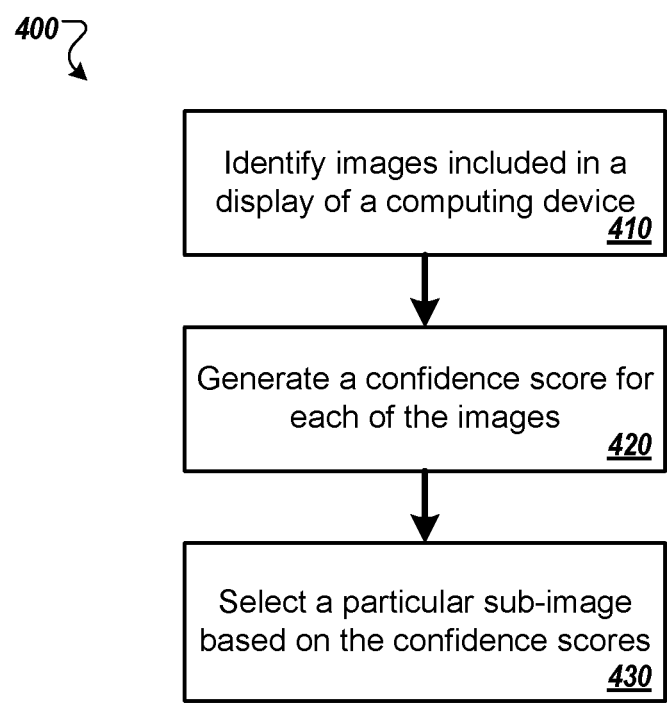
FIG. 4 is a flow chart illustrating an example process for selecting a particular sub-image using confidence scores.

FIG. 4 is a flow chart illustrating an example process 400 for selecting a particular sub-image using confidence scores. The process 400 can be performed by one or more servers or other computing devices. For example, operations of the process 400 can be performed by server 206 of FIG. 2. Operations of process 400 can also be implemented as instructions stored on a non-transitory computer-readable medium, and when the instructions are executed by one or more servers (or other computing devices,) the instructions cause the one or more servers to perform operations of the process 400.

At step 410, the server identifies images included in an image. In certain aspects, the server receives an image from a computing device and identifies a plurality images in the image. The server may be configured to perform image recognition on the image to identify the plurality of images. The images can include photographs, icons, drawings, pictures, and the like. The images can vary in size, shape, and type. In some aspects, the images correspond to a still frame of a video. For example, the image may be of a webpage that includes multiple images and a video that is playing in the background. The image may correspond to a single, captured frame of the video playing on the web page.

At step 420, the server generates a confidence score for each of the identified images. The confidence scores may each indicate a likelihood that an image is an image of primary interest to a user viewing the image. The confidence scores can be determined based on various features of the images. For example, the server may generate greater confidence scores for large images over small images in the image. In another example, the server may generate greater confidence scores for images with a large number of identifiable entities in the image, such as landmarks, people, or animals, and vice-versa.

At step 430, the server selects a particular sub-image based on the confidence scores. The server can be configured to select the particular sub-image based on the highest confidence score. As such, the confidence scores of the images may be compared to determine which image is associated with the greatest confidence score. In some examples, the server selects multiple images. In this instance, the server can be configured to select images if each of the selected images satisfy a predetermined image confidence score threshold. This may be the case when multiple images in the image include similar entities or objects. For example, two images in an image may include the Eiffel Tower and a third image may not include the Eiffel Tower. As such, the two respective images that include the Eiffel Tower may be selected as the particular sub-images due to the similar content in each of the two images.

Figure 5:
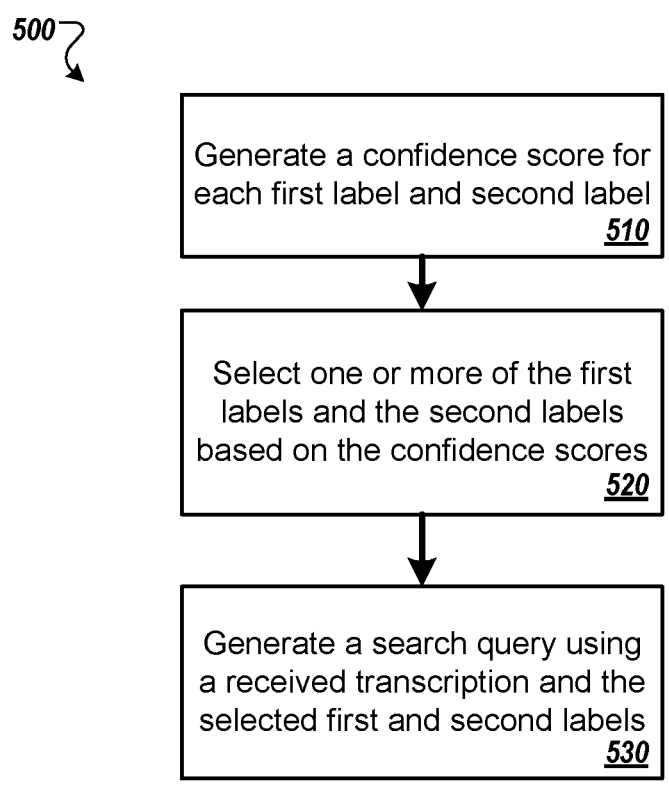
FIG. 5 is a flow chart illustrating an example process for generating a search query using selected labels.

FIG. 5 is a flow chart illustrating an example process 500 for generating a search query using selected labels. The process 500 can be performed by one or more servers or other computing devices. For example, operations of the process 500 can be performed by server 206 of FIG. 2. Operations of process 500 can also be implemented as instructions stored on a non-transitory computer-readable medium, and when the instructions are executed by one or more servers (or other computing devices,) the instructions cause the one or more servers to perform operations of the process 500.

At step 510, the server generates a confidence score for each of first labels and second labels. The first labels may correspond to a particular sub-image identified in an image and the second labels may correspond to a portion of the image other than the particular sub-image. For example, the particular sub-image may be a photograph of the Eiffel Tower in the image and the portion of the image other than the particular sub-image may include comments about the photograph. The confidence scores for the first and second labels each indicate a likelihood that the respective label corresponds to a portion of the particular sub-image that is of primary interest to the user.

At step 520, the server selects one or more of the first labels and the second labels based on the confidence scores. For example, the server may select a single label with the greatest confidence score. In another example, the server is configured to select labels with confidence scores that satisfy a predetermined confidence score threshold. In another example, the server is configured to select a predetermined number of labels with the greatest confidence scores.

At step 530, the server generates a search query using a received transcription, the selected first labels, and the selected second labels. The server can be configured to provide the generated search query for output. For example, the server can be configured to provide the generated search query to a search engine. In another example, the server may generate the search query and transmit the search query to a computing device. In this instance, the search query may be provided to a user audially or visually by the computing device.

Figure 6:
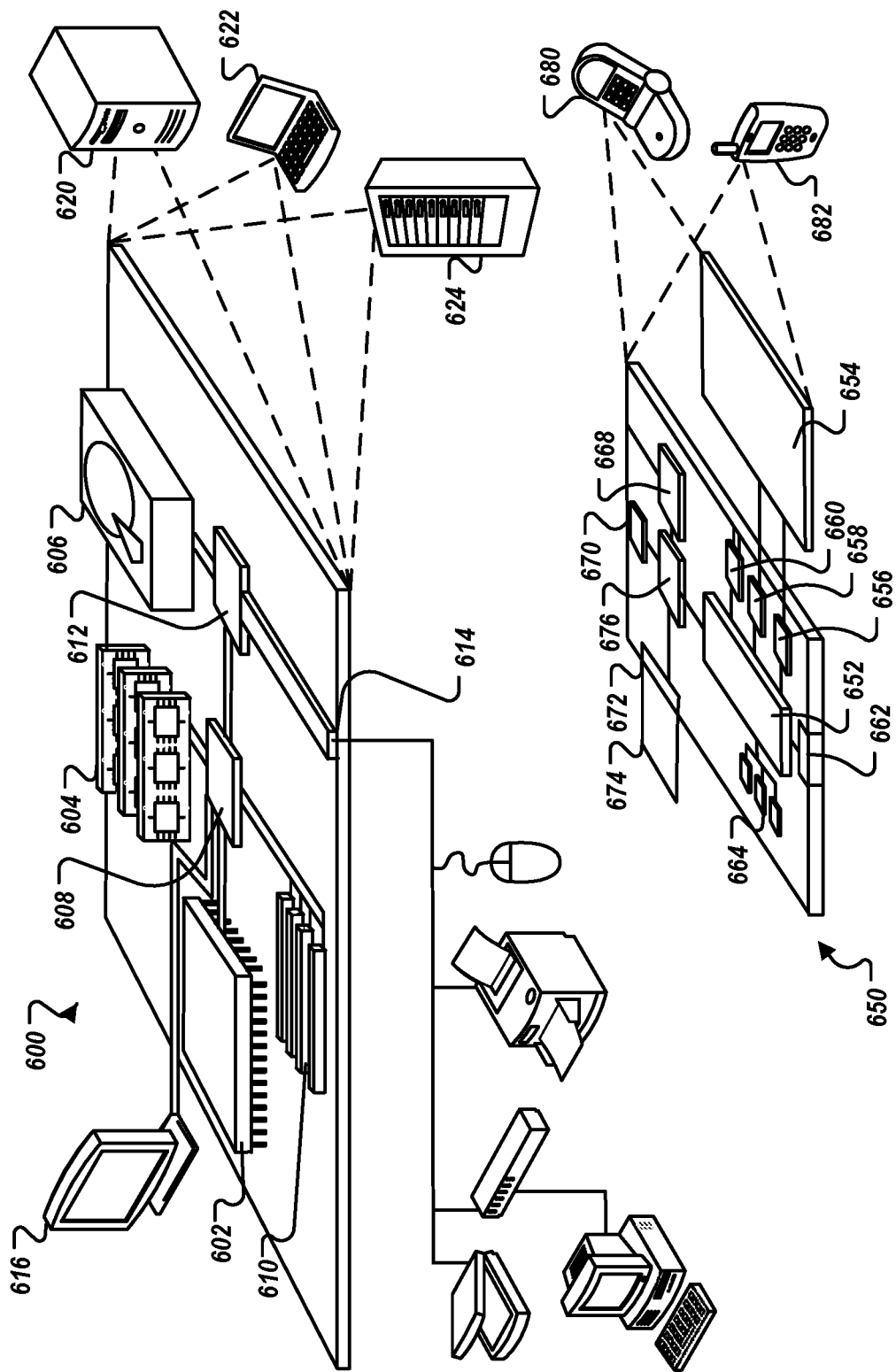
FIG. 6 is a diagram of an example computing device and an example mobile computing device.

FIG. 6 is a diagram of an example computing device 600 and an example mobile computing device 650, which may be used with the techniques described herein. Computing device 600 is intended to represent various forms of digital computers, such as laptops, desktops, workstations, personal digital assistants, servers, blade servers, mainframes, and other appropriate computers. Mobile computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as mobile computing device 650. Each of such devices may contain one or more of computing devices 600, 650, and an entire system may be made up of multiple computing devices 600, 650 communicating with each other.

Mobile computing device 650 includes a processor 652, memory 664, an input/output device such as a display 654, a communication interface 666, and a transceiver 668, among other components. The mobile computing device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may execute instructions within the mobile computing device 650, including instructions stored in the memory 664. The processor may be implemented as a chipset of chips that include separate and multiple analog and digital processors. The processor may provide, for example, for coordination of the other components of the mobile computing device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of mobile computing device 650 with other devices. External interface 662 may provide, for example, for wired communication in some implementations, or for wireless communication in other implementations, and multiple interfaces may also be used.

The memory 664 stores information within the mobile computing device 650. The memory 664 may be implemented as one or more of a computer-readable medium or media, a volatile memory unit or units, or a non-volatile memory unit or units. Expansion memory 654 may also be provided and connected to device 650 through expansion interface 652, which may include, for example, a SIMM (Single In Line Memory Module) card interface. Such expansion memory 654 may provide extra storage space for device 650, or may also store applications or other information for device 650. Specifically, expansion memory 654 may include instructions to carry out or supplement the processes described above, and may include secure information also. Thus, for example, expansion memory 654 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 654, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 650 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A computer implemented method comprising:
receiving a representation of a graphical interface being presented on a display of a computing device and a transcription of an utterance spoken by a user of the computing device;
identifying two or more images that are included in the graphical interface;
for each of the two or more images, determining a number of entities that are included in the image;
based on the number of entities that are included in each of the two or more images and for each of the two or more images, determining an image confidence score that reflects a likelihood that the image is of primary interest to the user;
based on the image confidence scores for each of the two or more images, selecting an image of the two or more images;
based on performing image recognition on the selected image, determining one or more first labels that indicate a context of the selected image;
based on performing text recognition on an area of the graphical interface that does not include the selected image, determining one or more second labels that indicate the context of the selected image;

comparing the one or more first labels and the one or more second labels to past queries received from the user;
based on comparing the one or more first labels and the one or more second labels to past queries received from the user, determining, for each of the one or more first labels and the one or more second labels, a label confidence score that reflects a likelihood that the respective label is associated with portion of the selected image that is of primary interest to the user;
based on the label confidence scores of the one or more first labels and the one or more second labels, selecting, from among the one or more first labels and the one or more second labels, a subset of the one or more first labels and the one or more second labels;
based on the transcription and the subset of the one or more first labels and the one or more second labels, generating a search query; and
providing, for output, the search query.

2. The method of claim 1, wherein generating the search query comprises substituting one or more of the subset of the one or more first labels and the one or more second labels for terms of the transcription.

3. The method of claim 1, wherein generating a search query comprises:
accessing historical query data that includes previous search queries provided by other users;
generating, based on the transcription and the subset of the one or more first labels and the one or more second labels, one or more candidate search queries;
comparing the historical query data to the one or more candidate search queries; and
based on comparing the historical query data to the one or more candidate search queries, selecting the search query from among the one or more candidate search queries.

4. The method of claim 1, wherein generating a search query comprises:
based on the transcription and the subset of the one or more first labels and the one or more second labels, generating one or more candidate search queries;
determining, for each of the one or more candidate search queries, a query confidence score that indicates a likelihood that the candidate search query is an accurate rewrite of the transcription; and
selecting, based on the query confidence scores, a particular candidate search query as the search query.

5. The method of claim 1, comprising:
receiving data indicating a selection of a control event at the computing device, the control event identifying the image,
wherein the image of the two or more images is selected based on receiving the data indicating the selection of the control event.

6. The method of claim 1, wherein the computing device is configured to capture the graphical interface and capture audio data that corresponds to the utterance in response to detecting a predefined hotword.

7. The method of claim 1, comprising:
receiving a representations of an additional graphical interface being presented on the display of the computing device and an additional transcription of an additional utterance spoken by a user of the computing device;
identifying an additional image that is included in the additional graphical interface;
based on performing image recognition on the additional image, determining one or more additional first labels that indicate a context of the additional image;
based on performing text recognition on a portion of the additional graphical interface that does not include the additional image, determining one or more additional second labels that indicate the context of the additional image;
based on the additional transcription, the additional first labels, and the additional second labels, generating a command; and
performing the command.

8. The method of claim 7, wherein performing the command comprises performing one or more of storing the representation of the additional graphical interface in memory, storing the additional image in the memory, uploading the representation of the additional graphical interface to a server, uploading the additional image to the server, importing the representation of the additional graphical interface to an application of the computing device, and importing the additional image to the application of the computing device.

9. The method of claim 1, comprising:
identifying metadata associated with the selected image,
wherein determining the one or more first labels that indicate the context of the selected image is based further on the metadata associated with the selected image.

10. The method of claim 1, comprising:
for each of the two or more images, determining a size of the image; and
based on the size of each of the two or more images and for each of the two or more images, adjusting the image confidence score that reflects a likelihood that the image is of primary interest to the user,
wherein the image of the two or more images is selected based on the adjusted image confidence scores for each of the two or more images.

11. The method of claim 1, wherein, for each of the two or more images, determining a number of entities that are included in the image comprises determining a number of landmarks, people, and animals that are included in the image.

12. A system comprising:
one or more computers and one or more storage devices storing instructions that are operable, when executed by the one or more computers, to cause the one or more computers to perform operations comprising:
receiving a representation of a graphical interface being presented on a display of a computing device and a transcription of an utterance spoken by a user of the computing device;
identifying two or more images that are included in the graphical interface;
for each of the two or more images, determining a number of entities that are included in the image;
based on the number of entities that are included in each of the two or more images and for each of the two or more images, determining an image confidence score that reflects a likelihood that the image is of primary interest to the user;
based on the image confidence scores for each of the two or more images, selecting an image of the two or more images;
based on performing image recognition on the selected image, determining one or more first labels that indicate a context of the selected image;

based on performing text recognition on an area of the graphical interface that does not include the selected image, determining one or more second labels that indicate the context of the selected image;

comparing the one or more first labels and the one or more second labels to past queries received from the user;

based on comparing the one or more first labels and the one or more second labels to past queries received from the user, determining, for each of the one or more first labels and the one or more second labels, a label confidence score that reflects a likelihood that the respective label is associated with portion of the selected image that is of primary interest to the user;

based on the label confidence scores of the one or more first labels and the one or more second labels, selecting, from among the one or more first labels and the one or more second labels, a subset of the one or more first labels and the one or more second labels;

based on the transcription and the subset of the one or more first labels and the one or more second labels, generating a search query; and providing, for output, the search query.

13. The system of claim 12, wherein the operation of generating a search query comprises weighting the one or more first labels differently than the one or more second labels.

14. The system of claim 12, wherein the operation of generating the search query comprises substituting one or more of the subset of the one or more first labels and the one or more second labels for terms of the transcription.

15. The system of claim 12, wherein the operation of generating a search query comprises:

accessing historical query data that includes previous search queries provided by other users;

generating, based on the transcription and the subset of the one or more first labels and the one or more second labels, one or more candidate search queries;

comparing the historical query data to the one or more candidate search queries; and based on comparing the historical query data to the one or more candidate search queries, selecting the search query from among the one or more candidate search queries.

16. A non-transitory computer-readable medium storing software comprising instructions executable by one or more computers which, upon such execution, cause the one or more computers to perform operations comprising:

receiving a representation of a graphical interface being presented on a display of a computing device and a transcription of an utterance spoken by a user of the computing device;

identifying two or more images that are included in the graphical interface;

for each of the two or more images, determining a number of entities that are included in the image;

based on the number of entities that are included in each of the two or more images and for each of the two or more images, determining an image confidence score that reflects a likelihood that the image is of primary interest to the user;

based on the image confidence scores for each of the two or more images, selecting an image of the two or more images;

based on performing image recognition on the selected image, determining one or more first labels that indicate a context of the selected image;

based on performing text recognition on an area of the graphical interface that does not include the selected image, determining one or more second labels that indicate the context of the selected image;

comparing the one or more first labels and the one or more second labels to past queries received from the user;

based on comparing the one or more first labels and the one or more second labels to past queries received from the user, determining, for each of the one or more first labels and the one or more second labels, a label confidence score that reflects a likelihood that the respective label is associated with portion of the selected image that is of primary interest to the user;

based on the label confidence scores of the one or more first labels and the one or more second labels, selecting, from among the one or more first labels and the one or more second labels, a subset of the one or more first labels and the one or more second labels;

based on the transcription and the subset of the one or more first labels and the one or more second labels, generating a search query; and providing, for output, the search query.

17. The non-transitory computer-readable medium of claim 16, wherein the operation of generating a search query comprises weighting the one or more first labels differently than the one or more second labels.

18. The non-transitory computer-readable medium of claim 16, wherein the operation of generating the search query comprises substituting one or more of the subset of the one or more first labels and the one or more second labels for terms of the transcription.

* * * * *